US012771023B2

(12) United States Patent
Lenets et al.

(10) Patent No.: US 12,771,023 B2
(45) Date of Patent: *Oct. 20, 2026

(54) COMMUNICATION DEVICE COMPRISING A RETROREFLECTIVE STRUCTURE

(71) Applicant: HUAWEI TECHNOLOGIES CO., LTD., Shenzhen (CN)

(72) Inventors: Vladimir Lenets, Aalto (FI); Ana Diaz Rubio, Aalto (FI); Francisco Cuesta Soto, Aalto (FI); Sergei Tretyakov, Aalto (FI); Xuchen Wang, Aalto (FI); Alexander Khripkov, Helsinki (FI); Janne Ilvonen, Helsinki (FI); Antti Karilainen, Kista (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 84 days.

This patent is subject to a terminal disclaimer.

(21) Appl. No.: 18/820,756

(22) Filed: Aug. 30, 2024

(65) Prior Publication Data

US 2025/0062528 A1 Feb. 20, 2025

Related U.S. Application Data

(63) Continuation of application No. 17/958,065, filed on Sep. 30, 2022, now Pat. No. 12,095,168, which is a (Continued)

(51) Int. Cl.
*H01Q 3/26* (2006.01)
*H01Q 1/42* (2006.01)

(52) U.S. Cl.
CPC .......... *H01Q 3/2647* (2013.01); *H01Q 1/422* (2013.01)

(58) Field of Classification Search
CPC ...... H01Q 3/2647; H01Q 1/422; H01Q 1/526; H01Q 19/021; H01Q 19/10; H01Q 1/243
See application file for complete search history.

(56) References Cited

U.S. PATENT DOCUMENTS 9,923,277 B2 3/2018 Baek et al.
10,461,401 B2 10/2019 Ko et al.
(Continued)

FOREIGN PATENT DOCUMENTS

JP 2009085936 A 4/2009
JP 2013255259 A 12/2013
(Continued)

OTHER PUBLICATIONS

Wu et al., "Surface wave suppression in antenna systems using magnetic metamaterial," Research Article, DOI: 10.1063/1.2739312, Total 3 pages (Jun. 2007).
(Continued)

*Primary Examiner* — Daniel D Chang
(74) *Attorney, Agent, or Firm* — Leydig, Voit & Mayer, Ltd.

(57) ABSTRACT

The disclosure relates to suppressing surface waves in a communication device for a wireless communication system. The communication device includes a dielectric layer extending along a plane between a chassis and a glass layer, an antenna element configured to emit a radio wave, and a retroreflective structure extending inside the dielectric layer and being located adjacent to the antenna element, and where the retroreflective structure is configured to reflect the radio wave in an angle non-parallel to the plane. The retroreflective structure hence prevents parasitic channeling of the antenna energy into surface waves in and behind the glass layer and directs the radiation into the desired direction.

20 Claims, 9 Drawing Sheets

Related U.S. Application Data continuation of application No. PCT/EP2020/059201, filed on Apr. 1, 2020.

(56) References Cited

U.S. PATENT DOCUMENTS

| | | | | |
|---|---|---|---|---|
| 11,139,588 | B2 | 10/2021 | Edwards et al. | |
| 11,362,421 | B2 * | 6/2022 | Kim | H01Q 1/523 |
| 2012/0032865 | A1 | 2/2012 | Toyao et al. | |
| 2019/0312347 | A1 * | 10/2019 | Edwards | H01Q 9/0435 |

FOREIGN PATENT DOCUMENTS

| | | | |
|---|---|---|---|
| JP | 2019186942 | A | 10/2019 |
| KR | 20190060283 | A | 6/2019 |
| WO | 2010125784 | A1 | 11/2010 |
| WO | 2015083457 | A1 | 6/2015 |
| WO | 2019103398 | A1 | 5/2019 |
| WO | 2019120515 | A1 | 6/2019 |

OTHER PUBLICATIONS

Kildal, “Artificially soft and hard surfaces in electromagnetics,” IEEE Transactions on Antennas and Propagation, vol. 38, No. 10, Total 8 pages (Oct. 1990).

Sievenpiper et al., “High-impedance electromagnetic surfaces with a forbidden frequency band,” DOI: 10.1109/22.798001, IEEE Transactions on Microwave Theory and Techniques, vol. 47, No. 11, Total 16 pages (Nov. 1999).

Mulenga et al., “Planar Electromagnetic Bandgap Structures Based on Polar Curves and Mapping Functions,” IEEE Transactions on Antennas and Propagation, vol. 58, No. 3, DOI: 10.1109/TAP.2009.2039319, Total 8 pages (Mar. 2010).

Kumar et al., “Surface wave suppression of microstrip antenna using different EBG designs,” DOI: 10.1109/ICSPCom.2015.7150676, Total 5 pages, (Mar. 2015).

Oraizi et al., “Design of Wideband Leaky-Wave Antenna Using Sinusoidally Modulated Impedance Surface Based on the Holography Theory,” DOI: 10.1109/LAWP.2018.2866712, IEEE Antennas and Wireless Propagation Letters, vol. 17, No. 10, Total 5 pages (Oct. 2018).

Dong et al., “Metamaterial-based antennas,” Proceedings of the IEEE, Invited Paper, Total 15 pages (Mar. 2012).

Glybovski et al., “Metasurfaces: From microwaves to visible,” Physics reports 634 (2016), Elsevier, Total 72 pages (May 2016).

Liu et al., “Metamaterials: reshape and rethink,” Research Advanced Materials and Materials Genome-Review, Engineering 2015, vol. 1, Issue 2, Total 6 pages (Jun. 2015).

Goussetis et al., “Tailoring the AMC and EBG characteristics of periodic metallic arrays printed on grounded dielectric substrate,” IEEE Transactions on Antennas and Propagation, vol. 54, No. 1, Total 8 pages (Jan. 2006).

English translation of WO2019/103398A1 (Year: 2019).

* cited by examiner

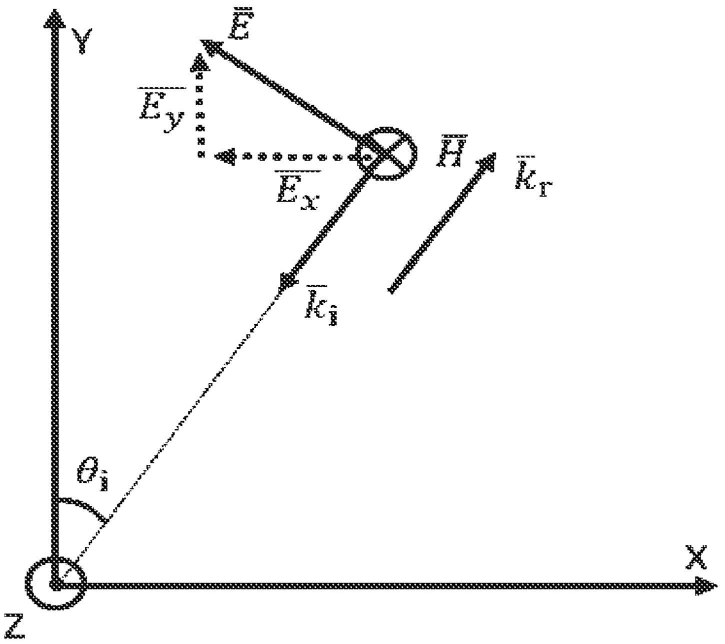
Fig. 4B
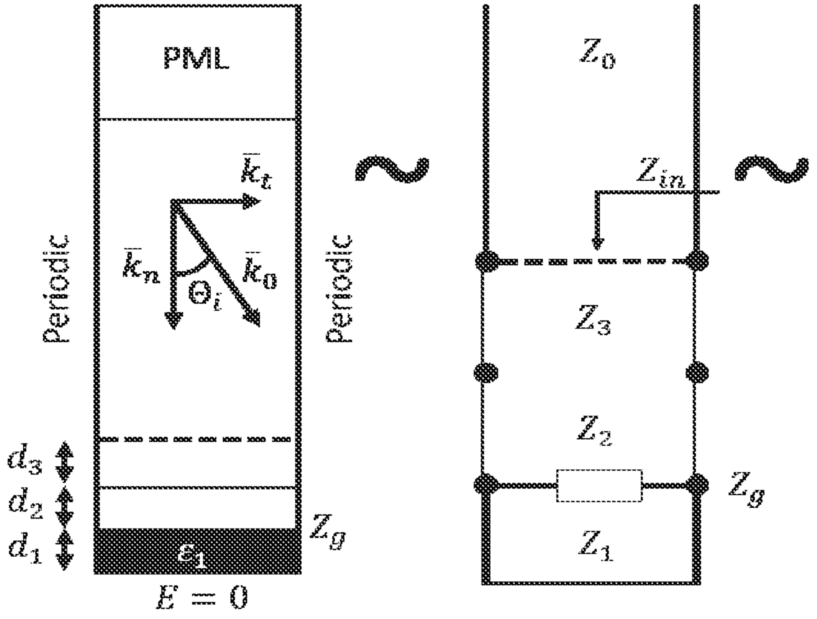
Fig. 5A
Fig. 5B
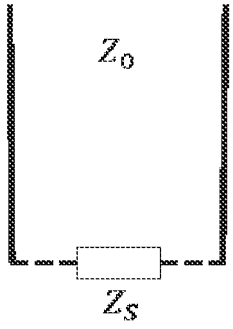
Fig. 5C

COMMUNICATION DEVICE COMPRISING A RETROREFLECTIVE STRUCTURE

CROSS-REFERENCE TO RELATED APPLICATIONS

This application is a continuation of U.S. patent application Ser. No. 17/958,065, filed on Sep. 30, 2022, which is a continuation of International Application No. PCT/EP2020/059201, filed on Apr. 1, 2020. Both of the aforementioned applications are hereby incorporated by reference in their entireties.

FIELD

The disclosure relates to a communication device comprising a retroreflective structure for reflecting radio waves emitted by an antenna element in the communication device.

BACKGROUND

Nowadays, smartphones play an important role in our daily activities, not only for communications but also for media applications. Media applications may involve processing, storing, or transmitting audio or video content, for example. Smartphones should be compact and give a robust feeling, while their price should remain affordable. One popular design comprises an all-display which is covered with glass and is framed with a strong metallic alloy frame. Other components, such as the camera, battery, and integrated circuits, are placed below the glass. Furthermore, the smartphone, for the transmission of media content, demands high data rates. Frequencies above 20 GHz, corresponding to wavelengths in the mmWave range, may be used. Antenna implementation beneath the smartphone glass is troublesome and may result in disturbed radiation patterns and reduced gain of the antenna, especially at high frequencies.

SUMMARY

Embodiments of the present disclosure provide a solution which mitigates or solves the drawbacks and problems of conventional solutions.

According to a first aspect of the disclosure, a communication device for a wireless communication system is provided, the communication device includes:

- a chassis,
- a glass layer,
- a dielectric layer extending along a plane between the chassis and the glass layer,
- an antenna element configured to emit a radio wave, and
- a retroreflective structure extending inside the dielectric layer and being located adjacent to the antenna element, wherein the retroreflective structure is configured to reflect the radio wave in an angle non-parallel to the plane.

The retroreflective structure can be configured to have an angle of reflection which is the same as an angle of incident and may further be referred to as a reflecting metasurface, an anomalously reflecting metasurface, or a beam shaping metasurface.

That the retroreflective structure is located adjacent to the antenna element can herein be understood to mean that the interaction between the retroreflective structure and the antenna element is so called near-field and occurs before the radio wave forms a wave-front. The distance between the retroreflective structure and the antenna element may, e.g., be less than half of the wavelength of the radio wave.

A dielectric layer can herein be understood as various components allocated between the chassis and the glass layer of the communication device. Said components of the dielectric layer vary for different locations of the antenna element within the communication device. In embodiments, the antenna element may be arranged at the back side surface of the communication device. Non-limiting examples of dielectric layer might include air-filled gaps between adjacent components, foam or plastic structures utilized as spacers, dielectric substrates of printed circuit boards, etc. In embodiments, the antenna element may be arranged as an edge of the communication device. Non-limiting examples of dielectric layer might include insert molding, plastic parts, foam or plastic structures and dielectric substrates of printed circuit boards. In yet further embodiments, the antenna element may be arranged at a display surface of the communication device. Non-limiting examples of dielectric layer might include structures of the display, including polarizer films, adhesive films, organic light emitting diode (OLED) substrates and liquid crystal (LC) films.

An advantage of the communication device according to the first aspect is that it prevents parasitic channeling of the antenna energy into surface waves in and behind the glass layer and instead directs the radiation into a desired direction. Thereby, improving the radiation pattern and gain of the antenna element in the communication device.

In an implementation form of a communication device according to the first aspect, the retroreflective structure has an inhomogeneous impedance along its extension in the dielectric layer.

An advantage with this implementation form is that this implementation form enables small area (e.g., less than half the wavelength) of the retroreflective structure, while preventing parasitic channeling of antenna energy into surface waves and thereby improving radiation pattern.

In an implementation form of a communication device according to the first aspect, the retroreflective structure is conductively or capacitively coupled to the antenna element.

An advantage with this implementation form is that the structure is strongly excited by the near fields of the antenna element and hence effectively reflects radiation into the desired directions.

In an implementation form of a communication device according to the first aspect, a first end of the retroreflective structure is conductively or capacitively coupled to the antenna element.

An advantage with this implementation form is eliminated parasitic channel between the retroreflective structure and the antenna ground plane. Since the retroreflective structure is coupled to the antenna element and therefore does not allow excitation of that guided mode. Guided modes are parasitic for antennas, and non-radiative electro-magnetic (EM) energy guided alongside the dielectric layers are reducing radiated EM energy. Thus, disclosed implementation form eliminates waves propagating along the ground plane inside the dielectric layer, further improving antenna efficiency.

In an implementation form of a communication device according to the first aspect, the retroreflective structure is located within a range r from the antenna element being less than half of the wavelength of the radio wave.

An advantage with this implementation form is that the footprint of the retroreflective structure is minimized and does not compromise performance of other device components allocated under the glass.

In an implementation form of a communication device according to the first aspect, the antenna element is arranged perpendicular to or parallel to the plane of the dielectric layer.

An advantage with this implementation form is that the retroreflective structure can function with antennas of different configurations. For example, an antenna aperture being generally parallel to the plane of the dielectric layer provides broad-side beamforming radiation. An antenna aperture being generally perpendicular to the plane of the dielectric layer provides end-fire beamforming radiation.

In an implementation form of a communication device according to the first aspect, the retroreflective structure has an extension inside the dielectric layer less than half of the wavelength of the radio wave.

An advantage with this implementation form is that the structure is compact and does not compromise performance of other devices located under the glass layer.

In an implementation form of a communication device according to the first aspect, the retroreflective structure is a conductive film.

An advantage with this implementation form is that it is easy to manufacture as a patterned metal layer.

In an implementation form of a communication device according to the first aspect, the conductive film includes a solid conductive film.

An advantage with this implementation form is that the solid conductive film manufacturing enables cost-efficient design.

In an implementation form of a communication device according to the first aspect, the conductive film includes capacitive elements and inductive elements forming a capacitive and inductive pattern.

An advantage with this implementation form is that this arrangement allows realization of the surface impedance needed for operation of the retroreflection structure. This implementation form enables design synthesis of the antenna beam shaping. The conductive film can be configured to reflect the radio wave in an angle non-parallel to the plane.

In an implementation form of a communication device according to the first aspect, a size of each capacitive element and each inductive element is less than quarter of the wavelength of the radio wave.

An advantage with this implementation form is that the retroreflective structure functions as an inhomogeneous impedance boundary, as required for operation as a retroreflective structure. This enables non-resonant frequency response. Thereby, the radio wave reflects into the desired direction in space for each frequency of the multiband antenna operation, with no reflection back to the emitter source.

In an implementation form of a communication device according to the first aspect, the capacitive and inductive pattern is a non-repeating pattern.

An advantage with this implementation form is that the retroreflective structure is capable of reflecting the waves into desired direction instead of conventional periodical stop-band structures which only forbid propagation of surface waves. This implementation form performs surface wave near-field transformation to radiated wave at the short section, e.g., less than half the wavelength.

In an implementation form of a communication device according to the first aspect, the capacitive and inductive pattern forms a grid pattern.

An advantage with this implementation form is that it allows repetitions of several sets of capacitive and inductive elements as supercells of a longer structure, to further enhance the performance.

In an implementation form of a communication device according to the first aspect, the radio wave is a transverse magnetic polarized radio wave.

An advantage with this implementation form is that this implementation form functions for antennas which emit transverse magnetic polarized radio waves. Transverse magnetic polarized radio wave has the strongest coupling to parasitic surface waves along the device cover, therefore converting transverse magnetic polarized radio waves into radiated waves enables dual-polarization beamforming of the antennas.

According to a second aspect of the disclosure, a method for producing a communication device for a wireless communication system is provided, the method includes:

obtaining a chassis and a glass layer;

obtaining a dielectric layer extending in a plane and including a retroreflective structure extending inside the dielectric layer, wherein the retroreflective structure is configured to reflect a radio wave in an angle being non-parallel to the plane;

arranging the dielectric layer between the chassis and the glass layer; and arranging an antenna element adjacent to the retroreflective structure; and conductively or capacitively coupling the antenna element to the retroreflective structure.

The method according to the second aspect can be extended into implementation forms corresponding to the implementation forms of the communication device according to the first aspect. Hence, an implementation form of the method includes the feature(s) of the corresponding implementation form of the communication device.

The advantages of the methods according to the second aspect are the same as those for the corresponding implementation forms of the communication device according to the first aspect.

Further applications and advantages of the embodiments of the disclosure will be apparent from the following detailed description.

BRIEF DESCRIPTION OF THE DRAWINGS

The appended drawings are intended to clarify and explain different embodiments of the disclosure, in which:

FIGS. 4A-4B illustrate a retroreflective concept and transverse magnetic mode vectors and their projections, FIGS. 5A-5C illustrate a retroreflective structure model according to an embodiment of the disclosure.

DETAILED DESCRIPTION

Figure 1:
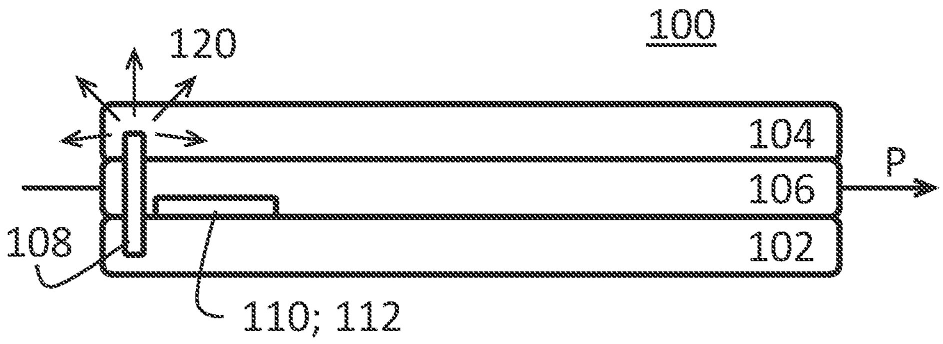
FIG. 1 schematically illustrates a communication device according to an embodiment of the disclosure, FIGS. 2A-2B schematically illustrate a retroreflective structure and an antenna element in a communication device according to an embodiment of the disclosure, FIGS. 3A-3B schematically illustrate a retroreflective structure and an antenna element in a communication device according to an embodiment of the disclosure.

The layer structure of a conventional smartphone results in surface waves, excited by an inner antenna, across the screen glass and the dielectric layer located below the screen glass. These surface waves strongly distort the radiation pattern of the antenna and reduce its gain and should therefore be avoided.

Conventional solutions for surface wave suppression can be grouped as volumetric and surface implementations. Volumetric solutions realize wave suppression by changing the overall electric properties of the materials of the layers. Common volumetric approaches for wave suppression are based on electro-magnetic bandgap structures (EBG), epsilon-negative materials (ENG), or mu-negative materials (MNG). Surface solutions are based on the creation of an additional interface inside the dielectric layer. Such changes in geometry modifies the dispersion properties of surface waves which can propagate in the dielectric layer.

A more practical implementation is obtained using a leaky-wave antenna approach, where surface wave propagation is reduced by radiating part of the energy away from the interface.

The solutions mentioned above only consider the nature of the smartphone body as a combination of different layers, without considering the antenna itself. Better results may be achieved by modifying the antenna radiation pattern itself. Proposed solutions in this area include an antenna device conformed by a plurality of radiation conductors and dummy conductors in a multi-layered circuit board and an antenna device conformed by a radiator surrounded by filter cells located over a substrate.

The conventional solutions have demonstrated promising results in terms of wave suppression or enhancement of antenna radiation properties under controlled conditions. Unfortunately, the assumptions chosen for each solution are incompatible with the constrains imposed by an antenna below the glass of an all-display smartphone. The smartphone design prioritizes the display over other device characteristics. Hence, any structure placed behind the glass should affect little-to-none the display performance. This condition requires a compact antenna, which is impossible using the conventional solutions for surface wave suppression as they require a large area.

In addition, some of the conventional solutions are implemented with volumetric structures that cannot be placed behind the glass without compromising antenna or display performance. In some implementations, the structure cannot fit between the glass and the chassis, requiring changes of the smartphone dimensions without any guarantee of performance improvement. It should also be noted that the structure design should be compatible with practical fabrication methods. However, fabrication of volumetric structures is challenging and expensive, and in practice only thin planar sheets of materials can be used.

In summary, the conventional solutions for surface wave suppression promise good performance under ideal conditions. However, a compact implementation of these solutions is not possible, and they are hence not suitable for antennas incorporated in all-display smartphones.

Embodiments of the disclosure address the above-mentioned drawbacks and improve the performance of an antenna located behind a glass layer in a communication device using a retroreflective structure designed to reflect electromagnetic waves that could excite surface waves. The retroreflective structure is arranged to prevent parasitic channeling of the antenna energy into surface waves in and behind the glass layer and to direct the radiation into the desired direction. Thereby, improving the radiation pattern and gain of the antenna in the communication device.

FIG. 1 schematically illustrates a communication device 100 for a wireless communication system according to an embodiment of the disclosure. The communication device 100 comprises a chassis 102, a glass layer 104, and a dielectric layer 106. With reference to FIG. 1, the dielectric layer 106 extends along a plane P between the chassis 102 and the glass layer 104. The dielectric layer 106 may further be referred to as a dielectric display or dielectric spacer.

The communication device 100 further comprises an antenna element 108 and a retroreflective structure 110. The antenna element 108 is configured to emit a radio wave 120. In embodiments, the radio wave 120 may be a transverse magnetic polarized radio wave.

With reference to FIG. 1, the retroreflective structure 110 extends inside the dielectric layer 106 and is located adjacent to the antenna element 108. In embodiments, the retroreflective structure 110 may be conductively or capacitively coupled to the antenna element 108. For example, a first end of the retroreflective structure 110 may be conductively or capacitively coupled to the antenna element 108.

The retroreflective structure 110 is configured to reflect the radio wave 120 emitted by the antenna element 108 in an angle non-parallel to the plane P. The angle of reflection of the retroreflective structure 110 is the same or substantially the same as an angle of incident. Thus, the angle non-parallel to the plane P in which the retroreflective structure 110 reflects the radio wave 120 is the same as an angle in which the radio wave 120 incident towards the retroreflective structure 110. The retroreflective structure 110 hence acts as an effective boundary which reflects the radio wave 120 from the antenna element 108 back to the antenna element 108.

The reflection phase of the retroreflected radio waves can be engineered by adjusting the topology of the retroreflective structure 110. According to embodiments of the disclosure the retroreflective structure 110 has an inhomogeneous impedance along its extension in the dielectric layer 106. In this way, the desired phase synchronism between the incident surface wave and reflected radiated waves can be ensured. Further details related to the topology of the retroreflective structure 110 will be described below with reference to FIGS. 4-7.

By exploiting the near-field region close to the antenna element 108, the retroreflective structure 110 may be used as a beamforming surface for the antenna element 108. The near-field region may be defined as up to half of the wavelength of the radio waves. The retroreflective structure 110 may hence in embodiments be located within a range r from the antenna element 108 being less than half of the wavelength of the radio wave 120. Furthermore, the retroreflective structure 110 may have an extension inside the dielectric layer 106 less than half of the wavelength of the radio wave 120.

According to embodiments of the disclosure the retroreflective structure 110 is a conductive film 112. Thus, the retroreflective structure 110 may be a thin and flat structure extending inside the dielectric layer 106 with a main extension along the plane P. The conductive film 112 may comprise a solid conductive film or the conductive film 112 may comprise capacitive elements and inductive elements forming a capacitive and inductive pattern.

In embodiments where the conductive film 112 comprises capacitive elements and inductive elements, a size of each capacitive element and each inductive element may be less than quarter of the wavelength of the radio wave 120. The capacitive elements and inductive elements may hence form a capacitive and inductive pattern which is subwavelength spaced. The capacitive and inductive pattern may further be a non-repeating pattern, e.g., a non-periodic pattern. In this way, resonance due to periodicity can be avoided. Furthermore, the capacitive and inductive pattern may form a grid pattern. The capacitive and inductive pattern may, e.g., be designed as a group of grip-impedance strips using discrete values of a reflector grid impedance function, as will be further described below.

Figure 2A:
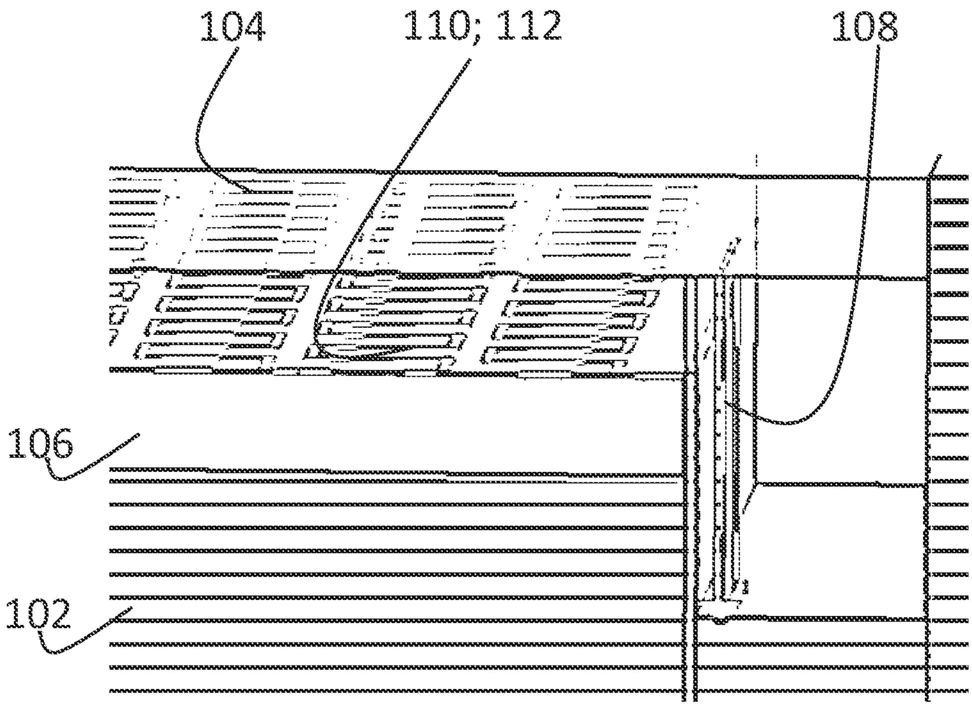
Figure 2B:
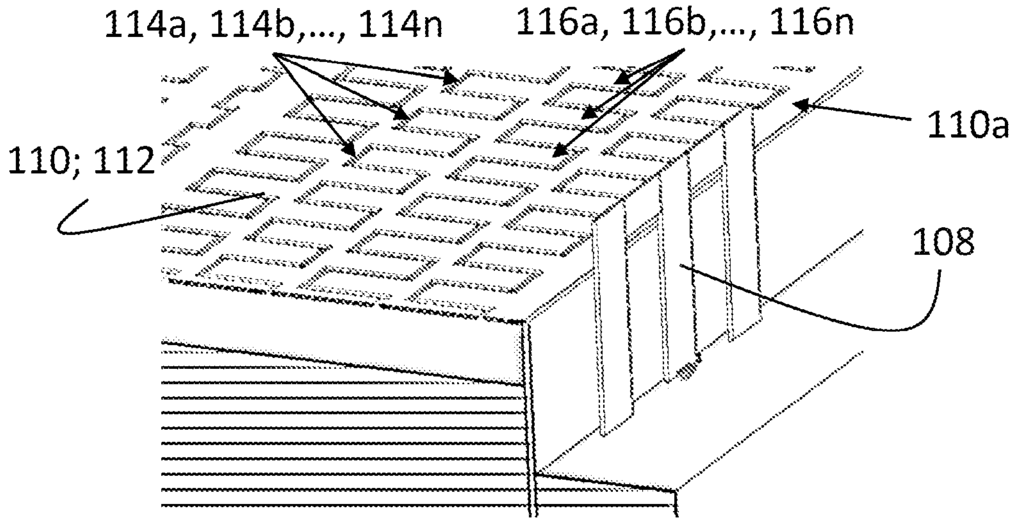

The antenna element 108 may be arranged perpendicular to or parallel to the plane P of the dielectric layer 106 or at other appropriate orientations. FIGS. 2*a-b* schematically illustrates an embodiment where the antenna element 108 is arranged perpendicular to the plane P of the dielectric layer 106. In the embodiment shown in FIGS. 2*a-b*, the antenna element 108 is a monopole and the retroreflective structure 110 is a conductive film 112 comprising capacitive elements 114*a*, 114*b*, . . . , 114*n* and inductive elements 116*a*, 116*b*, . . . , 116*n* forming a capacitive and inductive pattern. There are metal elements of the antenna structure which screen the volume between the conductive film 112 and the chassis/ground plane 102, preventing excitation of waves guided between the conductive film 112 and the chassis/ground plane 102. As an example, this can be ensured by conductively coupling the antenna element 108 at a first end 110*a* of the retroreflective structure 110, as shown in FIG. 2B.

Figure 3A:
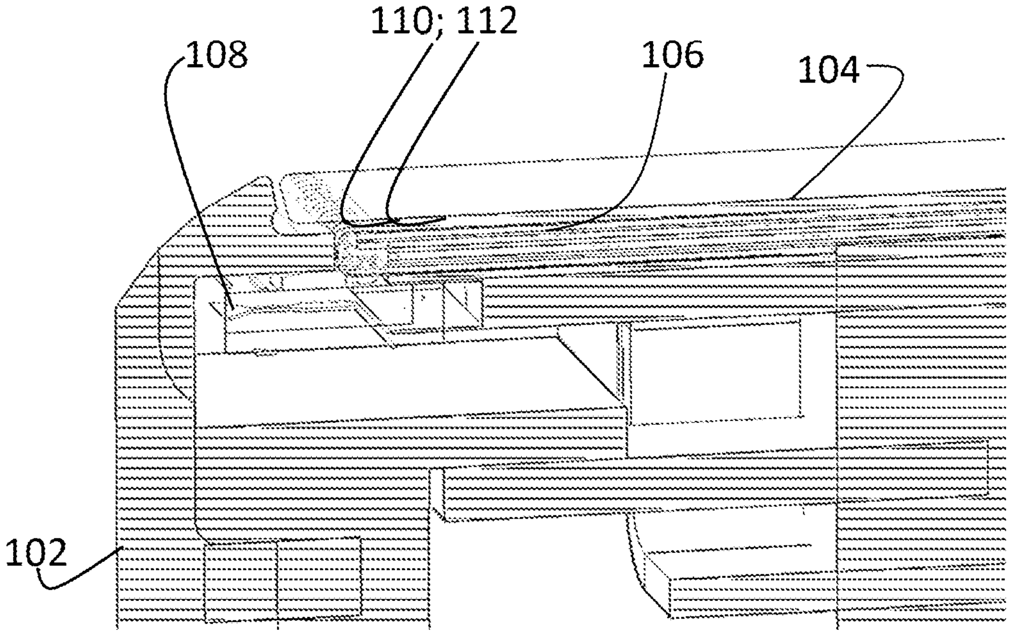
Figure 3B:
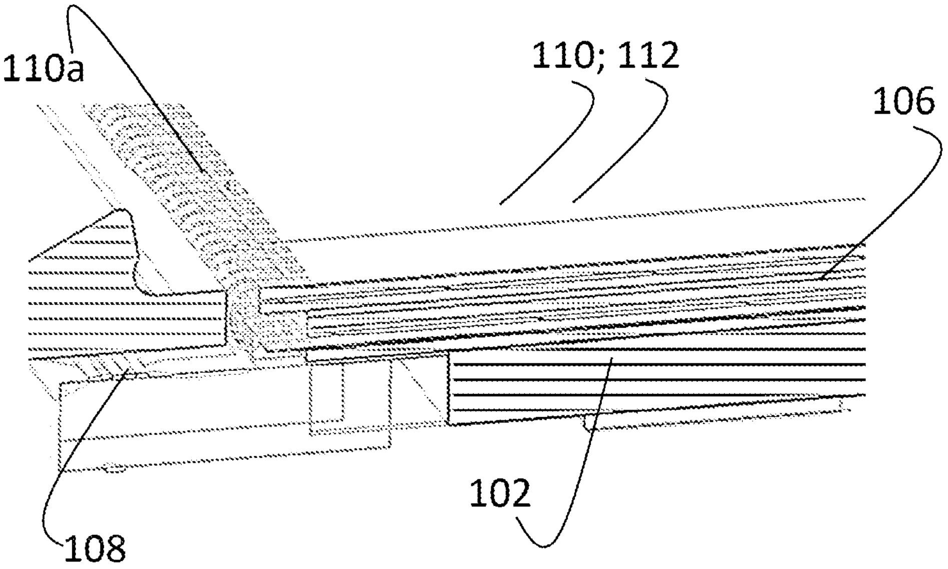

FIGS. 3A-3B schematically illustrates an embodiment where the antenna element 108 is arranged parallel to the plane P of the dielectric layer 106. In the embodiment shown in FIGS. 3*a-b*, the antenna element 108 is a monopole and the retroreflective structure 110 is a solid conductive film 112. The retroreflective structure 110 is further conductively coupled to the antenna element 108. There are metal elements of the antenna structure which screen the volume between the conductive film 112 and the chassis/ground plane 102, preventing excitation of waves guided between the conductive film 112 and the chassis/ground plane 102. As an example, this can be ensured by conductively coupling the antenna element 108 at a first end 110*a* of the retroreflective structure 110, as shown in FIG. 3B.

The above described embodiments are two examples of possible combinations of antenna element arrangement and type of retroreflective structure 110. However, other combinations are possible without deviating from the scope of the disclosure. For example, the antenna element 108 may be arranged perpendicular to the plane P of the dielectric layer 106 and the retroreflective structure 110 may be a solid conductive film; or the antenna element 108 may be arranged parallel to the plane P of the dielectric layer 106 and the retroreflective structure 110 may be a conductive film 112 forming a capacitive and inductive pattern.

Figure 4A:
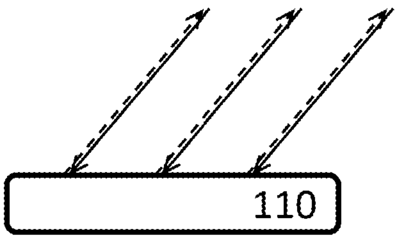

The retroreflective structure 110 allows re-direction of waves incident from space back towards the source of the incident wave, as indicated in FIG. 4A.

According to embodiments of the disclosure the retroreflective structure 110 can be implemented as a metasurface where the desired phase synchronism between the incident and reflected waves can be adjusted engineering surface impedance, defined via the boundary condition $$Z_s \hat{y} \times \overline{H}_t = \overline{E}_t, \tag{1}$$

where $E_t$ and $H_t$ are the tangential components of the total, i.e., incident plus reflected, electric and magnetic fields, and ŷ is the unit vector normal to the surface. Therefore, it is essential to define the tangential components of both electric and magnetic fields to provide the desired retroreflecting effect.

Due to the desired polarization of the fields, the retroreflective structure 110 may be designed for transverse-magnetic (TM)-polarized waves where there is no normal component of the magnetic field. Based on the coordinate definition shown in FIG. 4B, tangential components of the incident and reflected magnetic fields can be written as $$\overline{H}_i = H_0 e^{jk_x x + jk_y y} = H_0 e^{jk_0 x \sin\theta_i + jk_0 y \cos\theta_i} \hat{z}, \tag{2}$$

$$\overline{H}_r = RH_0 e^{-jk_x x - jk_y y} = RH_0 e^{-jk_0 x \sin\theta_i - jk_0 y \cos\theta_i} \hat{z}, \tag{3}$$

where $R=|R|e^{j\varphi_r}$ is the reflection coefficient ($\varphi_r$ is the phase of the reflection coefficient) and $\theta_i$ is the incident angle. To find the electric field components of the TM-wave, Ampere's law with time-harmonic dependency of the fields, $e^{j\omega t}$, is used $$\nabla \times \overline{H} = \frac{\partial \overline{D}}{\partial t} = j\varepsilon_0 \omega \overline{E}, \tag{4}$$

with $\varepsilon_0$ being the permittivity of the background media which is assumed to be vacuum. Therefore, the tangential electric fields are reduced into $$\overline{E}_i = \eta \cos\theta_i \, H_0 e^{jk_0 x \sin\theta_i} e^{jk_0 y \cos\theta_i} \hat{x}, \tag{5}$$

$$\overline{E}_r = -\eta \cos\theta_i \, RH_0 e^{-jk_0 \hat{x} \sin\theta_i} e^{-jk_0 \hat{y} \cos\theta_i} \hat{x}.$$

Using Equation (1) and knowing that the tangential component of the total magnetic and electric fields are the sums of the reflected and incident fields ($\overline{H}_t=\overline{H}_z=\overline{H}_i+\overline{H}_r$ and $\overline{E}_t=\overline{E}_x=\overline{E}_i+\overline{E}_r$, respectively), the surface impedance that models the retroreflective structure 110 reads $$Z_s(\phi) = \eta \cos\theta_i \frac{1-|R|e^{j\phi}}{1+|R|e^{j\phi}}, \tag{6}$$

where $\phi=-2k_0 \times \sin\theta_i+\varphi_r$ is the phase gradient introduced by the metasurface. The phase gradient required for the retroreflective structure 110 leads to a frequency-dependent surface impedance. From the definition of the phase gradient, the period of the retroreflective structure 110 is calculated as $$D = \frac{\lambda}{2\sin\theta_i}.$$

The period increases when the incidence angle decreases, and in the limit of zero angle, i.e., normal incidence, the retroreflective structure 110 degenerates to a usual uniform mirror. In either case, a compact retroreflective structure 110 will react to the fields near the antenna, and therefore only one period of the surface impedance is needed.

In the communication device 100, it becomes more convenient to create impedance of the retroreflective structure 110 using the glass surface as the reference, as shown in FIGS. 5*a-c*. The retroreflective structure 110 located inside the dielectric layer 106, can be modelled as a grid impedance $Z_g$ that will introduce discontinuity of the tangential magnetic fields at both sides of it.

Electromagnetic field propagates towards the retroreflective structure 110 at angle $\theta_i$ to the retroreflective structure 110 surface (see FIG. 5A). Incident electromagnetic field coefficients $\vec{k}_0$ having normal $\vec{k}_n=k_0\hat{y}$ and tangential $\vec{k}_t=k_0\hat{x}$ components is reflected at multilayer retroreflective structure 110 surface, having the glass cover layer with thickness $d_3$, dielectric layer between the glass cover layer and the conductive pattern 112 layer $d_2$, grid impedance $Z_g$ of the conductive pattern 112 and dielectric layer between the conductive pattern 112 and the ground plane $d_1$. Impedances of said dielectric layers $Z_1$, $Z_2$, $Z_3$ and grid impedance $Z_g$ (FIG. 5B) could be transformed to surface impedance $Z_s$ that models the retroreflective structure 110 (FIG. 5C).

To warrant that the multilayer structure behaves as a retroreflector over the glass surface, the behavior of the surface impedance defined in Equation (6) needs to be mimicked. Using the transmission-line approach, as shown in FIG. 5B, the input impedance of the multilayer system can be calculated and equated to the desired value. The resulting expression of the required grid impedance, as a function of the surface impedance and other parameters of the multilayer system, can be written as $$Z_g(Z_s) = \frac{Z_1 Z_2 \delta_1 [Z_3 (Z_2\delta_2 + Z_3\delta_3) - iZ_S (Z_2\delta_2\delta_3 - Z_3)]}{i Z_3 [Z_2 (Z_2\delta_2 + Z_3\delta_3) + Z_1\delta_1 (Z_2 - Z_3\delta_2\delta_3)] + Z_S [Z_2 (Z_2\delta_2\delta_3 - Z_3) + Z_1\delta_1 (Z_2\delta_3} \quad (7)$$

where $$\delta_n = \tan\left(d_n k_0 \sqrt{\varepsilon_n - \sin^2(\theta_i)}\right)$$

and $$Z_n = \frac{Z_0}{\varepsilon_n}\sqrt{\varepsilon_n - \sin^2(\theta_i)}$$

with n∈[1, 2, 3] numbering the dielectric layers.

Figure 6A:
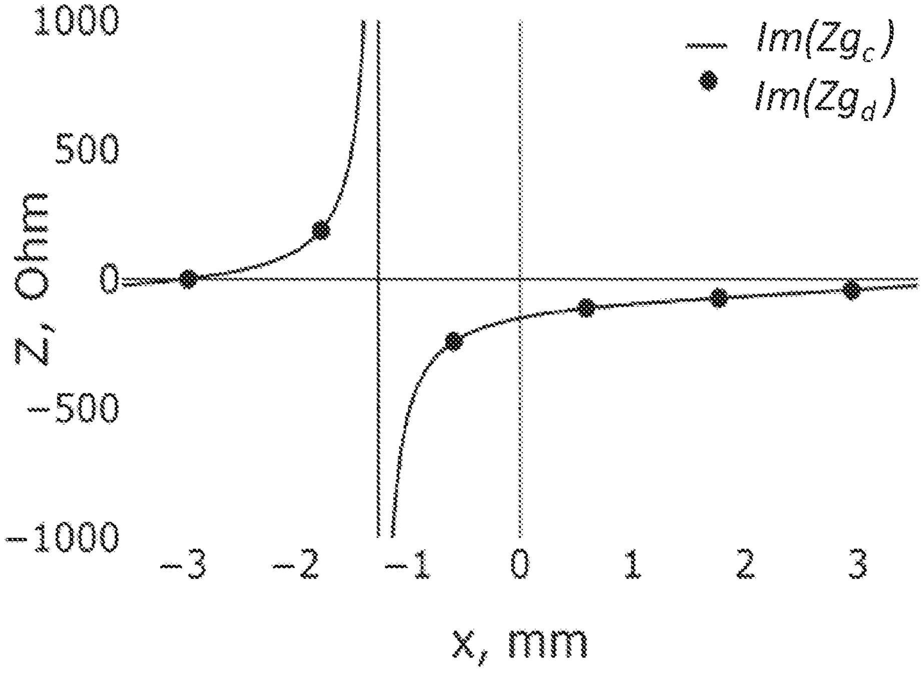
FIGS. 6A-6B illustrate impedance discretization according to an embodiment of the disclosure.
Figure 6B:
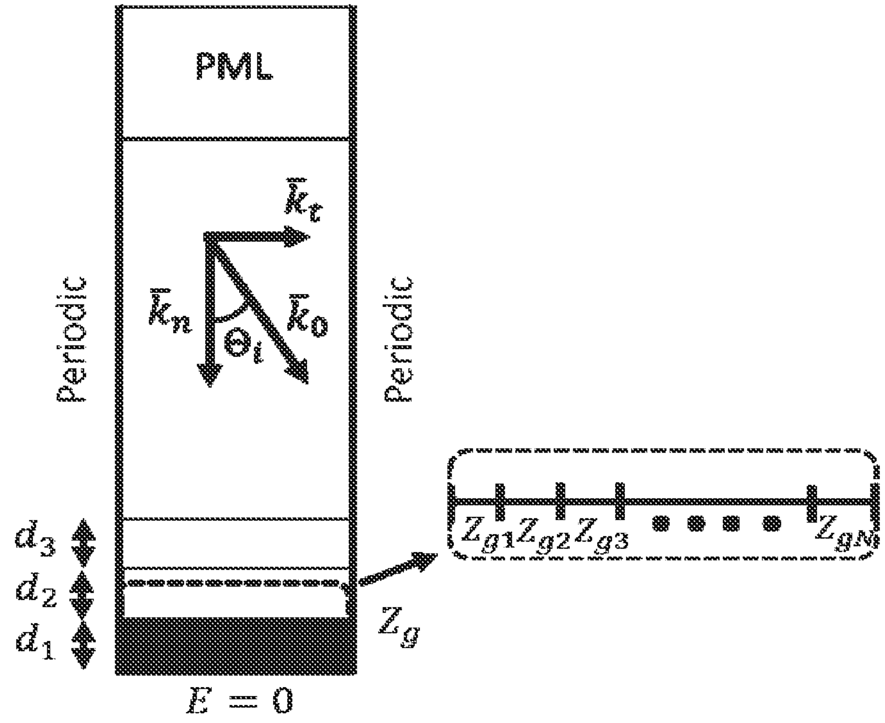

FIG. 6A illustrates a discretization of the grid and surface impedance profile. It is important to note that both the grid and surface impedances are continuous functions along the surface in the x-direction. This issue could become troublesome in terms of surface implementation, as the retroreflective structure 110 is realized as a set of finite-size elements. Therefore, the retroreflective structure 110 is discretized into strips with constant grid impedance values, as schematically represented in FIG. 6B, replacing a continuous function with a step-wise constant approximation. A good trade-off between performance and complexity can be achieved selecting the proper number of discrete values.

Figure 7A:
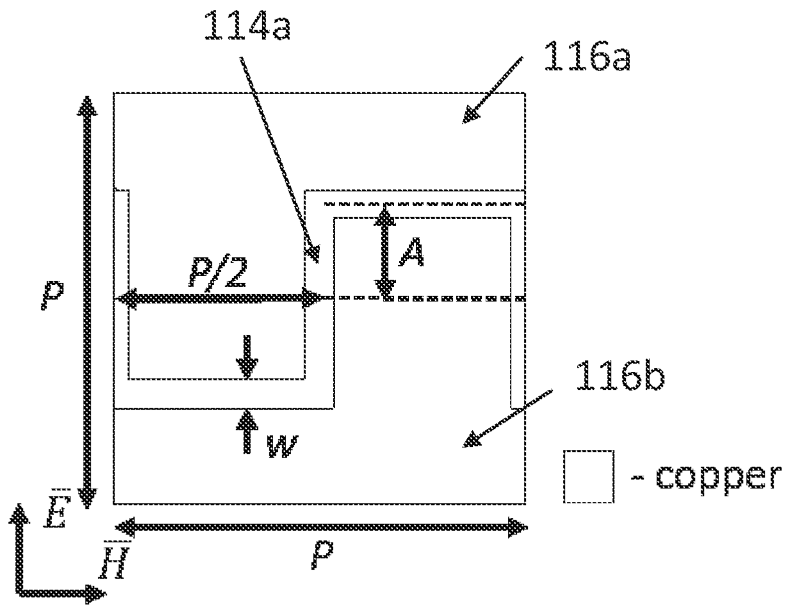
FIGS. 7A-7C illustrate a retroreflective structure geometry according to an embodiment of the disclosure.
Figure 7B:
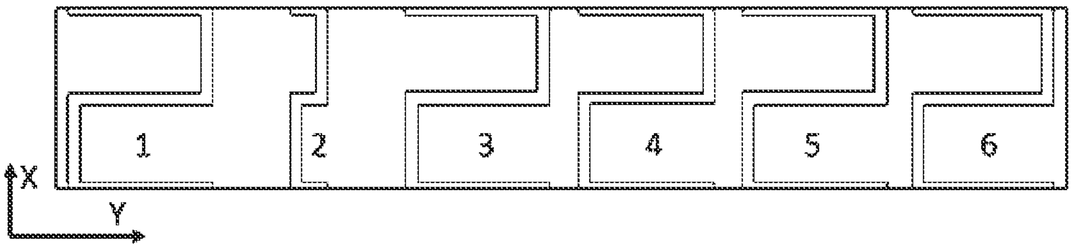
Figure 7C:
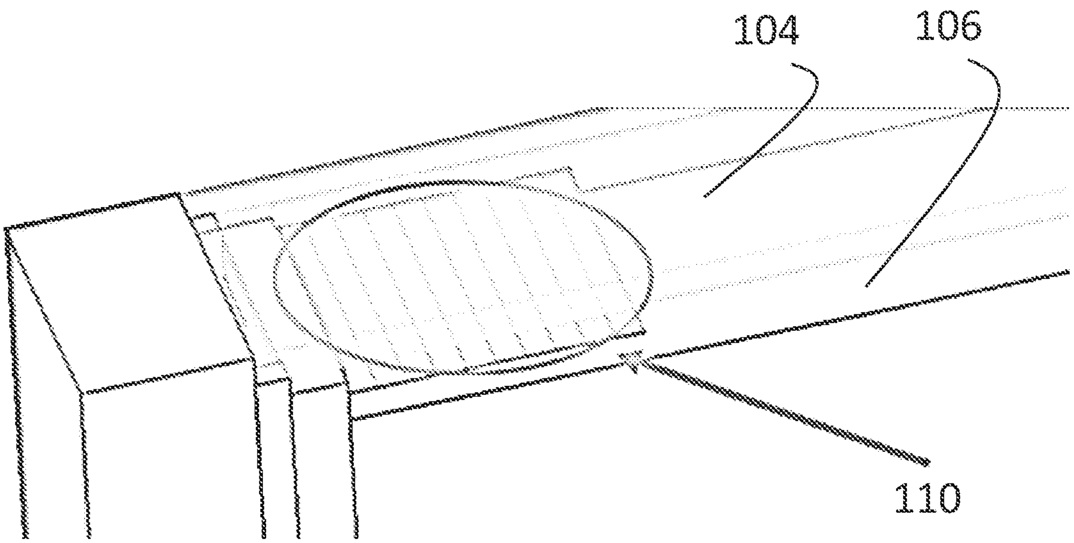

FIGS. 7*a-c* show the retroreflective structure 110 according to an embodiment where the retroreflective structure 110 has been discretized into six elements. The elements can, e.g., be fabricated based on a meandered-slot topology. FIG. 7A shows one element of the retroreflective structure 110 based on a meandered slot. Each element comprises two metal patches 116*a*, 116*b* separated by a gap or a slot 114*a* between them. The grid impedance $Z_g$ may be adjusted by changing a length A and a width w of the slot gaps. FIG. 7B show a profile of the retroreflective structure 110 along a y-axis, where the profile has been designed to realize the desired retroreflection functionality.

FIG. 7C shows the location of the retroreflective structure 110 inside the dielectric layer 106. The retroreflective structure 110 is in this embodiment located in the middle of the dielectric layer 106 below the glass layer 104.

Table 1 shows optimal values for a retroreflective structure 110 with angle of incidence $\theta_i$=85°, considering a glass with thickness 0.5 mm and relative permittivity 5.5, and where the dielectric layer 106 was characterized as a 1.0 mm slab with relative permittivity 2.7.

TABLE 1

| | # | | | | | |
|---|---|---|---|---|---|---|
| | 1 | 2 | 3 | 4 | 5 | 6 |
| Im($Z_g$) | −47 | −254 | −68 | −62 | −58 | −55 |
| Im($Z_s$) | 60 | −1255 | −54 | −18 | 0.86 | 20 |
| A, mm | 0.34 | 0.26 | 0.34 | 0.32 | 0.34 | 33 |
| w, mm | 0.06 | 0.065 | 0.065 | 0.055 | 0.063 | 0.058 |

For the embodiment shown in FIG. 7C, the required optimal impedance values given in Table 1 reveal that none of the discretized strips requires operation close to a resonance, even more, the retroreflective structure 110 is using only capacitive grid elements. Thereby, the retroreflective structure 110 can operate in a broader frequency band than other conventional structures, which can only operate in resonant regimes in narrow frequency ranges.

In terms of size, the proposed retroreflective structure 110 is a suitable compact solution, as its length is reduced into one-phase period of Equation 6. For the scenario discussed above, the length of the retroreflective structure 110 is about 5.2 mm, less than half-wavelength at the reference frequency of 29 GHz, while each element occupies ⅙ of the total length. The length of the elements can be reduced even more if more discretization points are used, with appropriate fabrication methods.

Figure 8:
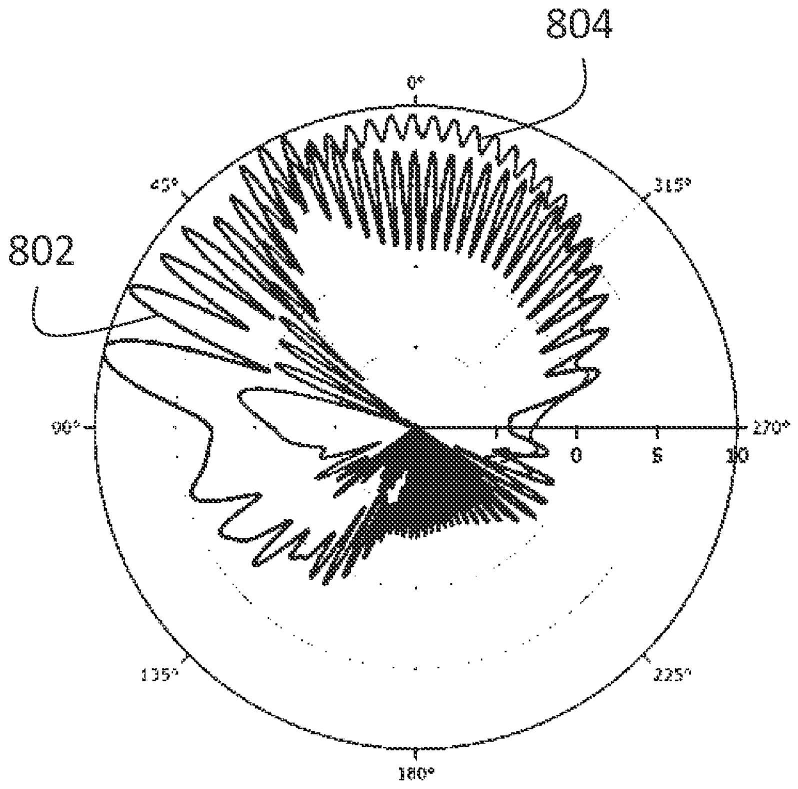
FIG. 8 illustrates directivity for a conventional communication device and for a communication device according to the disclosure.

With the retroreflective structure 110 according to the disclosure it is possible not only to block propagation of surface waves inside the dielectric layer 106, but this energy may further be redirected into the desired direction, as shown in FIG. 8. FIG. 8 shows directivity at 29 GHz for two scenarios: a first scenario 802 shows the directivity for a communication device without any structure for surface wave suppression, a second scenario 804 shows the directivity for the same communication device with an additional retroreflective structure 110 according to the disclosure in the middle of the dielectric layer 106. Note that surface waves propagating below the glass, at direction 90°, are suppressed by the retroreflective structure 110 and redirected into the region of interest on top of the glass, i.e., at direction θ°.

Figure 9A:
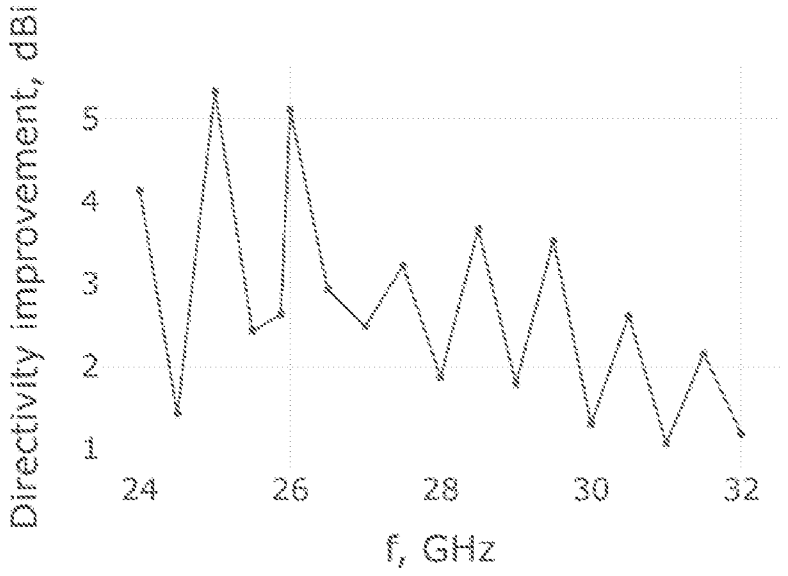
FIGS. 9A-9B illustrate directivity and gain improvement for a communication device according to the disclosure.
Figure 9B:
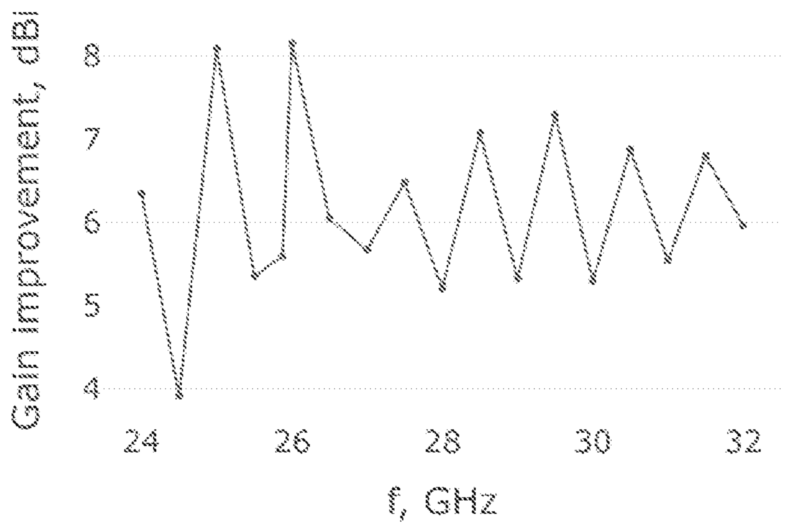

For different frequencies, the retroreflective structure 110 shows consistent improvements, as can be seen from FIGS. 9*a-b*. FIG. 9A shows directivity improvement of the retroreflective structure 110 and FIG. 9B shows gain improvement of the retroreflective structure 110. The retroreflective structure 110 may offer an average directivity improvement around 3 dB and gain improvement around 5 dB.

Figure 10:
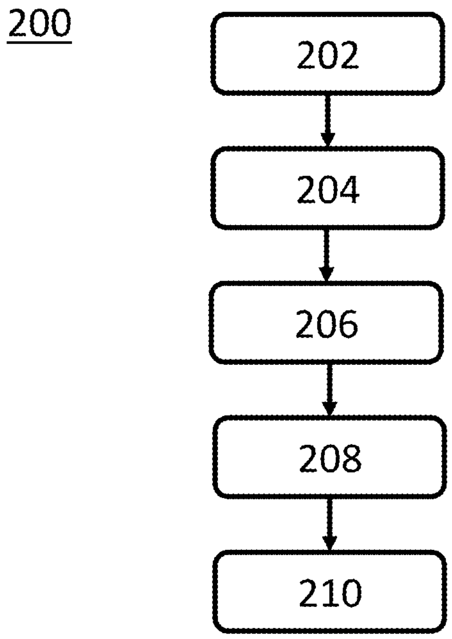
FIG. 10 illustrates a method for a communication device according to an embodiment of the disclosure.

The disclosure further relates to a method for producing a communication device 100 according to any of the described embodiments. FIG. 10 shows a flow chart of a method 200, the method 200 comprises obtaining 202 a chassis 102 and a glass layer 104 and further obtaining 204 a dielectric layer 106 extending in a plane P and comprising a retroreflective structure 110 extending inside the dielectric layer 106, wherein the retroreflective structure 110 is configured to reflect a radio wave 120 in an angle being non-parallel to the plane P. The method 200 further comprises arranging 206 the dielectric layer 106 between the chassis 102 and the glass layer 104; and arranging 208 an antenna element 108 adjacent to the retroreflective structure 110. The method 200 further comprises conductively or capacitively coupling 210 the antenna element 108 to the retroreflective structure 110.

The communication device 100 herein, may be denoted as a user device, a User Equipment (UE), a mobile station, an internet of things (IoT) device, a sensor device, a wireless terminal and/or a mobile terminal, and may be enabled to communicate wirelessly in a wireless communication system, sometimes also referred to as a cellular radio system. The UEs may further be referred to as mobile telephones, cellular telephones, computer tablets or laptops with wireless capability. The UEs in this context may be, for example, portable, pocket-storable, hand-held, computer-comprised, or vehicle-mounted mobile devices, enabled to communicate voice and/or data, via the radio access network, with another entity, such as another receiver or a server. The UE can be a Station (STA), which is any device that contains an institute of electrical and electronics engineers (IEEE) 802.11-conformant Media Access Control (MAC) and Physical Layer (PHY) interface to the Wireless Medium (WM). The UE may also be configured for communication in 3$^{rd}$ generation partnership project (3GPP) related long-term evolution (LTE) and LTE-Advanced, in worldwide interoperability for microwave access (WiMAX) and its evolution, and in fifth generation wireless technologies, such as New Radio.

Finally, it should be understood that the disclosure is not limited to the embodiments described above, but also relates to and incorporates all embodiments within the scope of the appended independent claims.

What is claimed is:

1. A communication device for a wireless communication system, the communication device comprising:
- a chassis;
- a glass layer;
- a dielectric layer extending along a plane between the chassis and the glass layer;
- an antenna element configured to emit a radio wave; and
- a retroreflective structure extending inside the dielectric layer and being located adjacent to the antenna element,
- wherein the retroreflective structure is configured to reflect the radio wave in an angle non-parallel to the plane and provides a beamforming surface for the antenna element, wherein the retroreflective structure is a conductive film, and wherein the conductive film comprises capacitive elements and inductive elements forming a capacitive and inductive pattern.

2. The communication device according to claim 1, wherein the retroreflective structure has an inhomogeneous impedance along an extension inside the dielectric layer.

3. The communication device according to claim 2, wherein the extension of the retroreflective structure inside the dielectric layer is less than half of the wavelength of the radio wave.

4. The communication device according to claim 1, wherein the retroreflective structure is conductively or capacitively coupled to the antenna element.

5. The communication device according to claim 4, wherein a first end of the retroreflective structure is conductively or capacitively coupled to the antenna element.

6. The communication device according to claim 1, wherein the retroreflective structure is located within a range from the antenna element being less than half of the wavelength of the radio wave.

7. The communication device according to claim 1, wherein the antenna element is arranged perpendicular to or parallel to the plane of the dielectric layer.

8. The communication device according to claim 1, wherein a size of each capacitive element and each inductive element is less than quarter of the wavelength of the radio wave.

9. The communication device according to claim 1, wherein the capacitive and inductive pattern is a non-repeating pattern.

10. The communication device according to claim 1, wherein the capacitive and inductive pattern forms a grid pattern.

11. The communication device according to claim 1, wherein the radio wave is a transverse magnetic polarized radio wave.

12. A method for producing a communication device for a wireless communication system, the method comprising:
- obtaining a chassis and a glass layer;
- obtaining a dielectric layer extending in a plane, the dielectric layer comprising a retroreflective structure extending inside the dielectric layer, and wherein the retroreflective structure is configured to reflect a radio wave in an angle being non-parallel to the plane;
- arranging the dielectric layer between the chassis and the glass layer;
- arranging an antenna element adjacent to the retroreflective structure; and
- conductively or capacitively coupling the antenna element to the retroreflective structure
- providing a beamforming surface for the antenna element, wherein the retroreflective structure is a conductive film, and wherein the conductive film comprises capacitive elements and inductive elements forming a capacitive and inductive pattern.

13. The method of claim 12, wherein the retroreflective structure has an inhomogeneous impedance along an extension inside the dielectric layer.

14. The method of claim 13, wherein the extension of the retroreflective structure inside the dielectric layer is less than half of the wavelength of the radio wave.

15. The method of claim 12, wherein the retroreflective structure is conductively or capacitively coupled to the antenna element.

16. The method of claim 15, wherein a first end of the retroreflective structure is conductively or capacitively coupled to the antenna element.

17. The method of claim 12, wherein the retroreflective structure is located within a range from the antenna element being less than half of the wavelength of the radio wave.

18. The method of claim 12, wherein the antenna element is arranged perpendicular to or parallel to the plane of the dielectric layer.

19. The method of claim 12, wherein a size of each capacitive element and each inductive element is less than quarter of the wavelength of the radio wave.

20. The method of claim 12, wherein the capacitive and inductive pattern is a non-repeating pattern.

* * * * *